(12) United States Patent
Roman et al.

(10) Patent No.: US 9,975,188 B2
(45) Date of Patent: May 22, 2018

(54) METAL CUTTING INSERT AND A MILLING TOOL

(71) Applicant: SANDVIK INTELLECTUAL PROPERTY AB, Sandviken (SE)

(72) Inventors: Stefan Roman, Valbo (SE); Per Viklund, Gavle (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 92 days.

(21) Appl. No.: 14/591,316

(22) Filed: Jan. 7, 2015

(65) Prior Publication Data
US 2015/0190869 A1    Jul. 9, 2015

(30) Foreign Application Priority Data
Jan. 8, 2014    (EP) .................................... 14150475

(51) Int. Cl.
B23C 5/20    (2006.01)
B23C 5/06    (2006.01)

(52) U.S. Cl.
CPC ................ *B23C 5/207* (2013.01); *B23C 5/06* (2013.01); *B23C 2200/0488* (2013.01); *B23C 2200/125* (2013.01); *B23C 2200/365* (2013.01); *B23C 2210/045* (2013.01); *Y10T 407/1924* (2015.01); *Y10T 407/23* (2015.01); *Y10T 407/235* (2015.01)

(58) Field of Classification Search
CPC .. B23C 5/02; B23C 5/20; B23C 5/202; B23C 5/207; B23C 2200/0405; B23C 2200/12; B23C 2200/208; B23C 2200/0488; B23C 2200/125; B23C 2200/365; B23C 2210/205; Y10T 407/2202; Y10T 407/2214; Y10T 407/2272;
(Continued)

(56) References Cited

U.S. PATENT DOCUMENTS

| | | |
|---|---|---|
| 2002/0028116 A1* | 3/2002 | Morgulis ................ B23C 5/202 407/67 |
| 2005/0169716 A1 | 8/2005 | Smilovici et al. |

(Continued)

FOREIGN PATENT DOCUMENTS

| | | |
|---|---|---|
| EP | 2022584 A1 | 2/2009 |
| WO | 2013180160 A1 | 12/2013 |

*Primary Examiner* — Nicole N Ramos
(74) *Attorney, Agent, or Firm* — Corinne R. Gorski

(57) ABSTRACT

An indexable cutting insert for a milling tool includes an upper side defining an upper extension plane and a lower side defining a lower extension plane parallel to the upper extension plane. A side surface connects the upper side and the lower side, the side surface including a plurality of upper main clearance surfaces and secondary clearance surfaces. At least six identical and alternately usable upper cutting edges extend around the upper side. Each cutting edge has a chip removing main cutting edge portion and at least one secondary cutting edge portion. The main cutting edge portion is formed in a transition between the upper side and one of the upper main clearance surfaces. The secondary cutting edge portion is formed in a transition between the upper side and one of the secondary clearance surfaces between two main cutting edge portions. The upper main clearance surfaces are formed at an obtuse inner angle α with respect to the upper extension plane as seen in side elevation view.

21 Claims, 15 Drawing Sheets

(58) Field of Classification Search
CPC ............. Y10T 407/2274; Y10T 407/23; Y10T 407/235; Y10T 407/24; Y10T 407/245
See application file for complete search history.

(56) References Cited

U.S. PATENT DOCUMENTS

| | | | |
|---|---|---|---|
| 2007/0003384 A1 | 1/2007 | Smilovici et al. | |
| 2009/0052998 A1* | 2/2009 | Sladek | B23C 5/2208 407/61 |
| 2010/0080662 A1* | 4/2010 | Satran | B23C 5/2213 407/40 |
| 2011/0170963 A1 | 7/2011 | Smilovici et al. | |
| 2012/0045289 A1* | 2/2012 | Ishi | B23C 5/06 409/132 |
| 2012/0275868 A1* | 11/2012 | Saito | B23C 5/06 407/42 |
| 2013/0156515 A1* | 6/2013 | Satran | B23C 5/207 407/48 |
| 2014/0178135 A1* | 6/2014 | Yamamoto | B23C 5/109 407/42 |

* cited by examiner

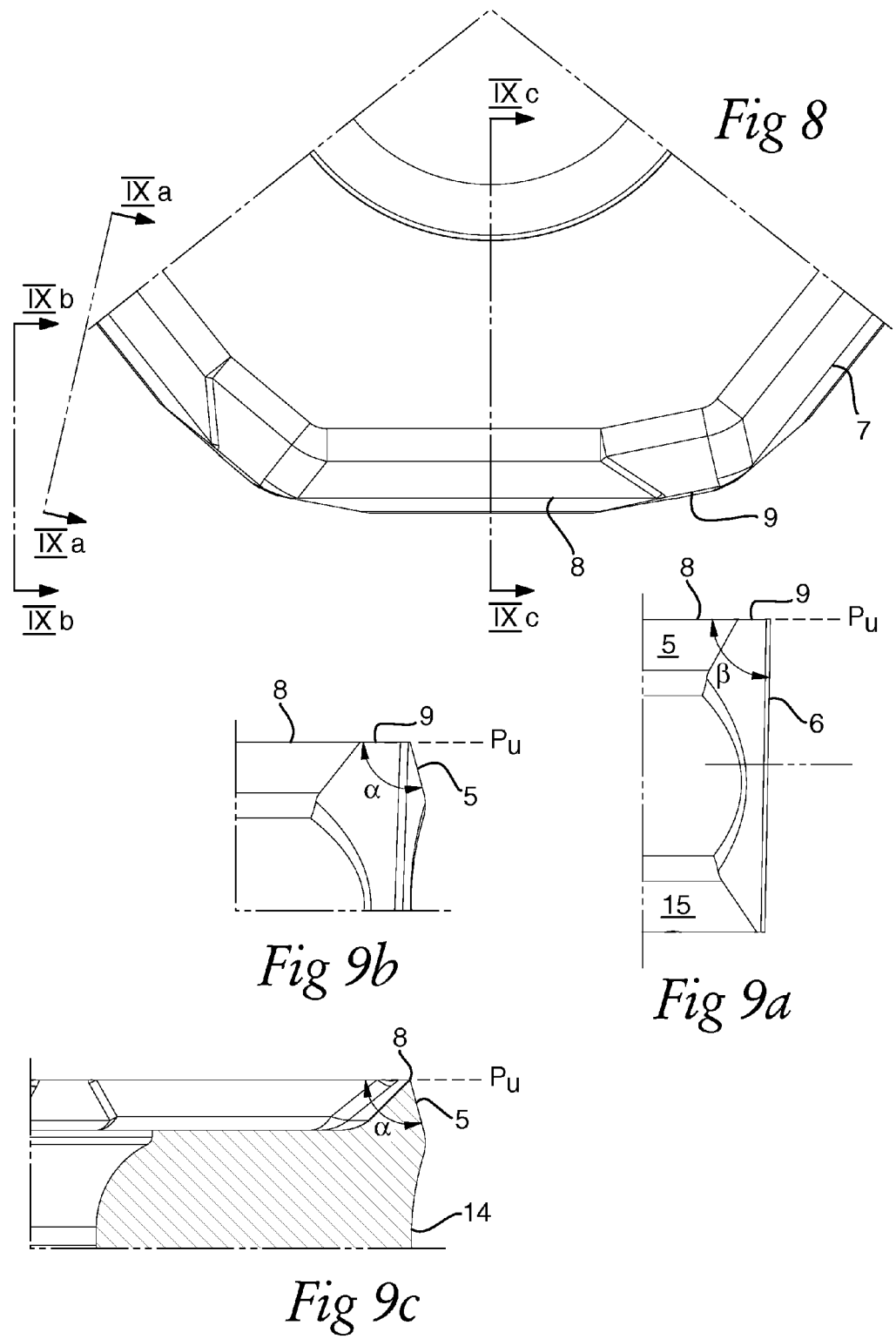

METAL CUTTING INSERT AND A MILLING TOOL

RELATED APPLICATION DATA

This application claims priority under 35 U.S.C. § 119 to EP Patent Application No. 14150475.3, filed on Jan. 8, 2014, which the entirety thereof is incorporated herein by reference.

TECHNICAL FIELD

The present disclosure relates to a cutting insert configured for chip-removing machining of a metallic workpiece by means of milling and to a milling tool having a tool body and at least one such cutting insert.

BACKGROUND

Milling tools for chip-removing machining of metal workpieces are generally composed of a rotatable tool body and a plurality of replaceable cutting inserts made of cemented carbide, ceramics, or other hard material. Since the cutting inserts are subjected to significant wear upon use in a milling tool, it is desirable for the insert to have as many edges as possible in order to prolong the service life of the cutting insert. Cutting inserts are therefore often made double-sided with cutting edges formed along both an upper side and a lower side of the insert, thus doubling the number of cutting edges per insert.

A face milling tool configured for chip-removing machining and a double-sided cutting insert with seven main cutting edges per side is disclosed in EP2022584. The milling tool comprises a tool body including a front end and a rear end, between which a central rotation axis extends around which the tool is rotatable in a direction of rotation and with which an envelope surface is concentric. Several insert seats are formed in a transition between the front end and the envelope surface. Each insert seat has a bottom support surface and a side support having at least one side support surface. A chip pocket is provided in front of each insert seat in the direction of rotation of the tool. The tool further includes several cutting inserts securely and detachably mounted in the insert seats.

The cutting insert disclosed in EP2022584 has an upper side defining an upper extension plane and a lower side defining a lower extension plane parallel to the upper extension plane, wherein a center axis extends perpendicularly through the upper extension plane and the lower extension plane. A side surface connects the upper side and the lower side, the side surface comprising a plurality of main and secondary clearance surfaces. Seven identical and alternately usable upper cutting edges extend around the upper side, wherein each cutting edge comprises a chip removing main cutting edge portion and a secondary cutting edge portion, wherein the main cutting edge portion is formed in a transition between the upper side and one of said main clearance surfaces, and the secondary cutting edge portion is formed in a transition between the upper side and one of said secondary clearance surfaces in a region between two main cutting edge portions. The milling insert has a conventional negative geometry with the clearance surfaces formed at right angles with respect to the upper and lower extension planes of the insert. The cutting insert is mounted in the tool body of the milling tool such that the main cutting edge is at a corner angle of 40°-44° with respect to the axis of rotation of the milling tool. In other words, the entering angle κ between the main cutting edge and the direction of feed of the milling tool is 46°-50°. The cutting insert further has curved cutting edges, which serve to ensure a positive effective angle of inclination of the main cutting edge also for negative axial and moderately negative radial tipping-in angles (rake angles). This improves the chip formation properties of the tool for moderate cutting depths. However, the effective angle of inclination is, even with the curved cutting edges, only moderately positive. Drawbacks associated with small effective angles of inclinations, such as cutting characteristics with regards not only to the chip formation and control but also to the toughness behaviour of the cutting edges and the noise level of the tool, are therefore present with a cutting insert and a milling tool disclosed in EP2022584.

SUMMARY

It is an aspect of the present disclosure to overcome the problems discussed above and to provide a cutting insert and a face milling tool with which it is possible to achieve an improved toughness behaviour of the cutting edges, an improved chip formation and control and a smoother machining resulting in lower noise levels.

According to this aspect of the disclosure, achieved by the cutting insert initially defined, which is characterised in that each of the upper main clearance surfaces is formed at an obtuse inner angle with respect to the upper extension plane as seen in side elevation view. In other words, the upper main clearance surface is inclined outwards. With this configuration, the angle of inclination of the main cutting edge may be set to strongly positive in a face milling tool configured such that the axial tipping-in angle, or axial rake angle, is neutral or negative, the radial tipping-in angle, or radial rake angle, is strongly negative, and the entering angle is acute. In other words, the cutting insert is configured to be mounted in the face milling tool at an extremely negative radial tipping-in angle (i.e. at least −25° and at most extreme −60°), which in combination with a neutral to moderate negative axial tipping-in angle (i.e. 0° to −20°) achieves a very positive angle of inclination on the main cutting edge portion of the face milling tool. The acute entering angle (typical for the face milling tool) is a prerequisite for obtaining the positive inclination on the main cutting edge portion. Thus, a negative radial tipping-in angle would not contribute to any positive inclination on the main cutting edge portion at an entering angle of 90° on the main cutting edge portion (i.e. on a shoulder milling tool). The positive inclination on the main cutting edge portion on the face milling tool will increase with more negative radial tipping-in angle and/or with reduced entering angle.

With a strongly positive angle of inclination of the main cutting edge, the face milling tool operates more smoothly since the main cutting edge portion gradually enters the workpiece, giving lower noise levels and an improved toughness behaviour of the cutting edges. Furthermore, the chip formation is excellent, giving spiral chips which are easily evacuated. Due to the possibility of having a large angle of inclination, the cutting insert has cutting characteristics similar to a single-sided cutting insert with positive geometry and thereby with a large angle of inclination. Similar to such an insert, it is suitable for face milling in stainless steel, such as duplex stainless steel. However, the negative geometry of the cutting insert according to the disclosure enables more cutting edges per cutting insert and therefore also a better tool economy than with a single-sided positive cutting insert.

The cutting insert according to the invention is configured for the extremely negative radial tipping-in angle by inclining the main clearance surfaces outwards (e.g. at an obtuse inner angle $\alpha$ within the range $93°\leq\alpha\leq118°$, preferably within the range $98°\leq\alpha\leq118°$ or $100°\leq\alpha\leq118°$). This increases the strength on the main cutting edge portion at the negative radial tipping-in angle. The outwardly inclined main clearance surfaces furthermore makes it possible to form the upper side with a chip surface having a relatively large chip surface angle $\varphi_1$ (e.g. within the range $35°\leq\varphi_1\leq55°$, and more preferably $40°\leq\varphi_1\leq55°$) with respect to the upper extension plane along the main cutting edge portion. The chip surface may thereby provide a positive rake angle despite the extremely negative radial tipping-in angle, whereas the outwardly inclined main clearance surface maintains an adequate cutting edge angle (i.e. the angle between the main clearance surface and the chip surface), and the strength on main cutting edge portion is thereby maintained.

According to one embodiment, the inner angle $\alpha$ between the upper extension plane and each of the upper main clearance surfaces is within the range $93°\leq\alpha\leq118°$. An angle smaller than $93°$ may result in a too large clearance between on one hand the main clearance surface located rotationally behind the chip-removing main cutting edge portion and on the other hand the generally cone-shaped surface generated by the same. A smaller angle than $93°$ will also reduce the strength of the cutting insert. An angle larger than $118°$ may instead give an insufficient clearance. The lower limit may preferably be increased to at least $98°$ or at least $100°$ in order to provide increased strength and the possibility of providing a larger chip surface angle at the negative radial tipping-in angle. Hence, according to an embodiment, the inner angle $\alpha$ is within the range $98°\leq\alpha\leq118°$ or $100°\leq\alpha\leq118°$, and preferably within the range $98°\leq\alpha\leq114°$ or $100°\leq\alpha\leq114°$, in which range the strength and clearance is optimised (e.g. at negative radial tipping-in angle within a sub-range of $-30°$ to $-50°$).

According to one embodiment, the upper side includes a recessed upper base surface extending in parallel with the upper extension plane, and an upper chip surface extending between the upper cutting edges and the upper base surface. The recessed upper base surface is an expedient way of achieving the chip surface angle and a positive rake angle, resulting in improved chip formation, lower cutting forces and thus also reduced power consumption. The chip surface angle $\varphi_1$ can be within the range $35°\leq\varphi_1\leq55°$, and within the range $40°\leq\varphi_1\leq55°$, with respect to the upper extension plane along the main cutting edge portion.

According to one embodiment, the upper side further includes at least one upper reinforcement land connecting the upper cutting edges with the upper chip surface. The at least one reinforcement land increases, at least partly inside the main cutting edge portion, the main cutting edge angle, which is the inner angle between the upper main clearance surface and the chip surface as seen in cross section, and thereby increases the strength of the cutting edge. The reinforcement land also acts so as to guide the chip away from the chip surface, reducing friction and thereby also heat generation. This embodiment is particularly useful for working at high loads. The width and the angle of the reinforcement land may be varied, but generally a wider reinforcement land enables working at higher loads. It is also possible to have more than one reinforcement lands, for example two reinforcement lands which are arranged in connection to each other and at a slightly different angle with respect to the upper extension plane.

According to one embodiment, each of the secondary clearance surfaces is formed at an inner angle $\beta$ with respect to the upper extension plane as seen in side elevation view, wherein $\beta<\alpha$. By forming the upper secondary clearance surface, which is located rotationally behind the secondary edge portion, at a smaller angle with respect to the upper extension plane than the upper main clearance surface, it is for negative axial tipping-in angles possible to achieve a clearance which is essentially the same rotationally behind the main cutting edge portion and rotationally behind the secondary cutting edge portion.

According to one embodiment, the inner angle $\beta$ between the upper extension plane and the secondary clearance surface below at least a part of the upper secondary cutting edge is within the range $85°\leq\beta\leq100°$. Within this range, the clearance behind the secondary edge portion is optimised for neutral ($0°$) to slightly negative axial tipping-in angles.

According to one embodiment, the cutting insert has at least seven identical and alternately usable upper cutting edges. The large number of cutting edges prolongs the service life of the cutting insert in comparison with a cutting insert with a smaller number of edges.

According to one embodiment, the cutting insert is double-sided with the lower side identical to the upper side. This doubles the number of usable cutting edges and thus also doubles the service life in comparison with a single-sided cutting insert.

According to one embodiment, the side surface includes a plurality of recessed support surfaces. By making the support surfaces recessed, their length may be increased so that the total support surface area is increased. The recessed support surfaces, which may be rounded or planar, thereby serve to improve the localisation of the cutting insert in an insert seat of a tool body when the cutting insert forms part of a milling tool, and to prevent rotation of the cutting insert within the insert seat.

According to one embodiment, the main cutting edge portion is rectilinear or essentially rectilinear. Such a cutting insert generally gives better chip formation along the entire length of the main cutting edge portion than a cutting insert with a curved main cutting edge portion. Thereby, the same cutting insert can, without chip formation problems, be used for different cutting depths.

According to one embodiment, an end portion of the main cutting edge portion forms a recess as seen in a side elevation view of the insert so that the end portion of the main cutting edge portion is located below a successive secondary cutting edge portion with respect to the upper extension plane. The end of the main cutting edge portion is herein designating a maximum cutting depth when the main cutting edge portion is active, and the successive secondary cutting edge portion is designating a secondary cutting edge portion associated with (or intended to be used together with) the next main cutting edge portion of the cutting insert (in the next successive index position). Furthermore, the end portion of the main cutting edge portion designates a relatively small portion of the main cutting edge portion (at most 20% of the entire length of the main cutting edge portion). The embodiment can hereby achieve a reliable clearance between the workpiece and an inactive main cutting edge portion being located radially inside an active secondary cutting edge portion. In other words, the recess formed in the end portion of the inactive main cutting edge portion provides a clearance to the plane machined surface radially inside the active secondary cutting edge portion during milling.

According to one embodiment, an end portion of the main clearance surface at an end portion of the main cutting edge portion has a smaller inner angle than the obtuse inner angle of the remaining main clearance surface. As in the previous embodiment, the end of the main cutting edge portion is herein designating the maximum cutting depth when the main cutting edge portion is active, wherein the end portion of the main cutting edge is a relatively small portion of the main cutting edge portion (i.e. ≤20% of the entire length of the main cutting edge portion). This embodiment is another or further way of achieving a reliable clearance radially inside the active secondary cutting edge portion. Thus, the clearance is achieved by reducing the inner angle of the main clearance surface locally at end portion of the inactive main cutting edge portion. This may for instance be achieved by grinding the clearance surface (after pressing and sintering the cutting insert) to achieve the reduced/smaller inner angle at the end portion. The inner angle between the upper extension plane and the end portion of the main clearance surface may be within the range 85° to 100°, preferably around 90° (±2°).

According to one embodiment, the main cutting edge portion is inclined as seen in side elevation view of the cutting insert so that the main cutting edge portion is declining with respect to the upper extension plane in a direction toward an end of the main cutting edge portion, wherein an end portion of the main cutting edge portion is located below a successive secondary cutting edge portion with respect to the upper extension plane. As previously mentioned, the end of the main cutting edge portion is herein designating the maximum cutting depth when the main cutting edge portion is active, and the successive secondary cutting edge portion is designating the secondary cutting edge portion associated with (intended to be used together with) the next main cutting edge portion of the cutting insert (in the next index position). This embodiment also achieves a reliable clearance between the workpiece and an inactive main cutting edge portion situated radially inside an adjacent and active secondary cutting edge portion during milling. There may be a risk that at least the end portion of the inactive main cutting edge portion, and in particular its main clearance surface, adjacent the active secondary cutting edge portion, will collide with the workpiece during milling. Clearance is hereby achieved by inclining the (inactive) main cutting edge portion so that the end portion is situated below the successive (active) secondary cutting edge portion with respect to the upper extension plane. The main cutting edge portion may be formed as a straight edge having a constant inclination along the entire length of the cutting edge, or it may be partly inclined or curved in a side elevation view of the cutting insert so that the end portion is located below the successive secondary cutting edge portion. The end portion may however also include an ascending transition edge connected to the successive secondary cutting edge portion. The transition edge is relatively short and is generally used to connect different cutting edge portions in a smooth manner to not only avoid abrupt/sharp corners and increase the strength of the cutting edge line in the transition between cutting edge portions, but also to facilitate the manufacturing of the cutting insert.

According to one embodiment, the secondary cutting edge portion is in the form of a curved edge portion extending between two adjacent main cutting edge portions and having at least one radius of curvature. Such a cutting insert is useful for example for large cutting depths since the main cutting edge portion is relatively long compared to a cutting insert with surface-wiping secondary edges. It also has strong corner regions and may functionally give reduced cutting forces in comparison with cutting inserts with surface-wiping secondary edges. A larger radius of curvature of the curved edge portion gives a stronger corner region. In the case when the cutting insert has curved edge portions, the transitions between the secondary clearance surfaces and the main clearance surfaces is normally gradual, such that there is no sharp edge marking the transition. In this case, it is to be understood that the secondary clearance surface is the surface portion rotationally behind the secondary cutting edge portion, and the main clearance surface is the surface portion rotationally behind the main cutting edge portion.

According to one embodiment, the secondary cutting edge portion is in the form of at least one facetted edge portion formed between two adjacent main cutting edge portions. Such a facetted edge portion could for example serve as a corner generating edge portion.

According to one embodiment, the at least one secondary cutting edge portion is in the form of a surface-wiping secondary edge. A cutting insert according to this embodiment may be used to generate planar surfaces and is preferably used for finishing operations. The angle that the surface-wiping secondary edge makes with the main cutting edge portion may be adapted for different entering angles of the milling tool.

According to one embodiment, each upper cutting edge comprises a first and a second surface-wiping secondary edge formed at an angle with respect to each other as seen in a plan view. In this embodiment, it is possible to use the same cutting insert in surface finishing operations with milling tools having different entering angles. It is also possible to form the secondary edges such that when the first secondary edge is used as a surface-wiping secondary edge, the second secondary edge functions as a corner generating edge. This may be useful for example when working cast iron in order to reduce the risk of edge frittering.

According to a second aspect of the disclosure, the above mentioned object is achieved by the face milling tool initially defined, which is characterised in that the tool includes at least one cutting insert according to the invention securely and detachably mounted in the at least one insert seat.

According to an embodiment of this second aspect of the disclosure, the tool is configured so that a main cutting edge portion is at an entering angle κ smaller than 80°, and so that the upper extension plane of the cutting insert is on one hand radially tipped in at a radial tipping-in angle $\gamma_f$ within the range $-60° \leq \gamma_f \leq -25°$ and on the other hand axially tipped in at an axial tipping-in angle $\gamma_m$ within the range $-20° \leq \gamma_m \leq 0°$. By means of such a tool, it is possible to achieve a strongly positive inclination angle of the main cutting edge portion, thus achieving the above mentioned advantages.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE DRAWINGS

FIG. 8 is a partial top view of the cutting insert of FIG. 7.

FIGS. 9a-c are partial side views and a cross-section taken along lines IXa-IXa, IXb-IXb and along line IXc-IXc in FIG. 8, respectively.

DETAILED DESCRIPTION OF EMBODIMENTS

Figure 1:
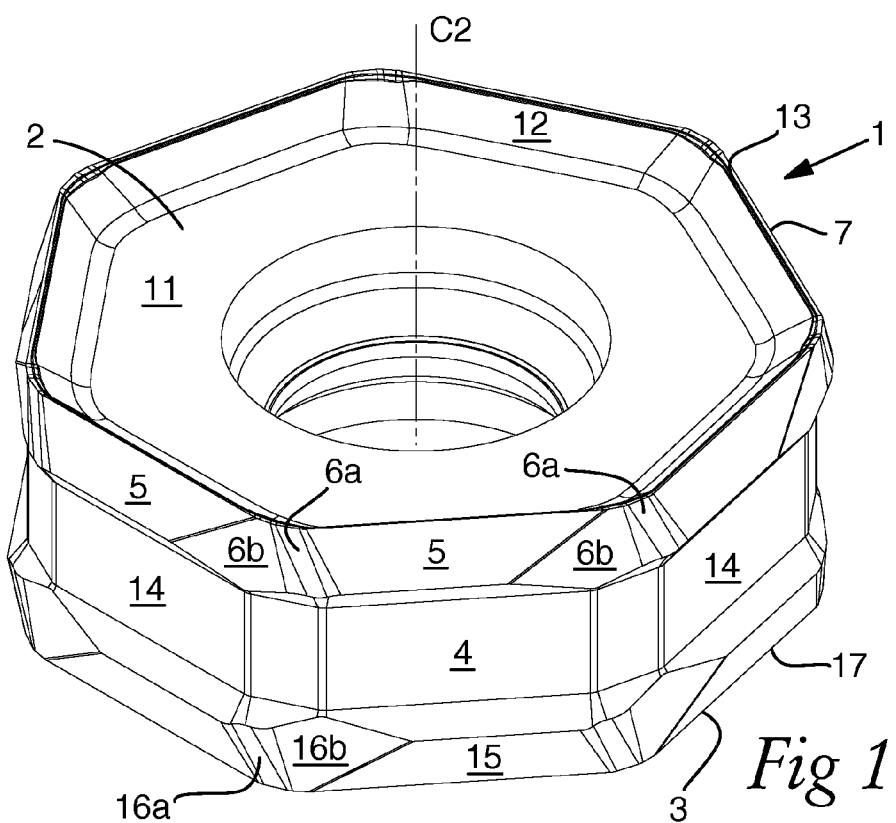
FIG. 1 is a perspective view of a cutting insert according to a first embodiment of the disclosure.

The cutting insert according to a first embodiment of the disclosure is shown in FIGS. 1-4. The cutting insert 1 is double-sided with a polygonal basic shape and includes an upper side 2 defining an upper extension plane $P_U$ and an identical lower side 3 defining a lower extension plane $P_L$, which is parallel to the upper extension plane $P_U$. A center axis C2 extends perpendicularly through the upper extension plane $P_U$ and the lower extension plane $P_L$.

The upper side 2 and the lower side 3 are connected by a side surface 4, which includes several main clearance surfaces 5, 15 and secondary clearance surfaces 6a, 6b, 16a, 16b. Around the upper side 2, seven identical and alternately usable cutting edges 7 extend. Each cutting edge includes an essentially rectilinear chip removing main cutting edge portion 8 and a first and a second secondary cutting edge portion 9, 10, formed as surface-wiping edges. The main cutting edge portion 8 is formed in a transition between the upper side 2 and one of the upper main clearance surfaces 5. The first secondary cutting edge portion 9 is formed in a transition between the upper side 2 and a first upper secondary clearance surface 6a in a region between two main cutting edge portions 8, that is, in a corner region of the cutting insert 1. The second secondary cutting edge portion 10 is formed in a transition between the upper side 2 and a second upper secondary clearance surface 6b. The first secondary cutting edge portion 9 is here configured to act as a surface-wiping secondary edge when the cutting insert 1 is mounted in a milling tool with an entering angle κ of approximately 25°.

Alternatively, if the cutting insert 1 is mounted in a milling tool with an entering angle κ of approximately 42°, the first secondary cutting edge portion 9 acts as a corner edge, while the second secondary cutting edge portion 10 at this entering angle is configured to act as a surface-wiping secondary edge. Thus, the milling insert 1 according to this embodiment can be used for two different entering angles. The edge portions between the main cutting edge portion 8, the first secondary cutting edge portion 9, the second secondary cutting edge portion 10 and the next main cutting edge portion 8 are formed as radial transitions.

Figure 4A:
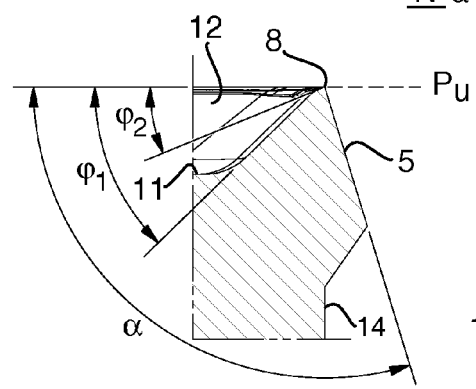
FIGS. 4a-c are partial cross-sections taken along lines IVa, IVb, and IVc of FIG. 3, respectively.
Figure 4B:
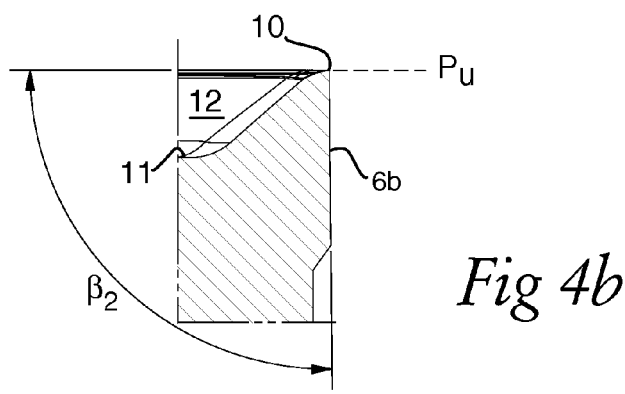

The cutting insert 1 further includes a recessed upper base surface 11 extending in parallel with the upper extension plane $P_U$. An upper chip surface 12 extends in the region between the upper cutting edges 7 and the upper base surface 11. Furthermore, between the cutting edges 7 and the base surface 11, a reinforcement land 13 extends. The cutting insert 1 in this first embodiment also includes, in its side surface 4, several recessed support surfaces 14 forming a "waist" around the cutting insert. As can be seen in FIGS. 4a and 4b, the radial distance measured from the center axis C2 to the recessed support surface 14 below one of the main cutting edge portions 8 equals the radial distance from the centre axis C2 to the main cutting edge portion 8. However, in the corner region, the corresponding distance between the recessed support surface 14 and the centre axis C2 is smaller than the distance from the center axis C2 to the secondary cutting edge portions 9, 10. Transition surfaces are formed between the recessed support surface 14 and the clearance surfaces 5, 6a, 6b.

Figure 2:
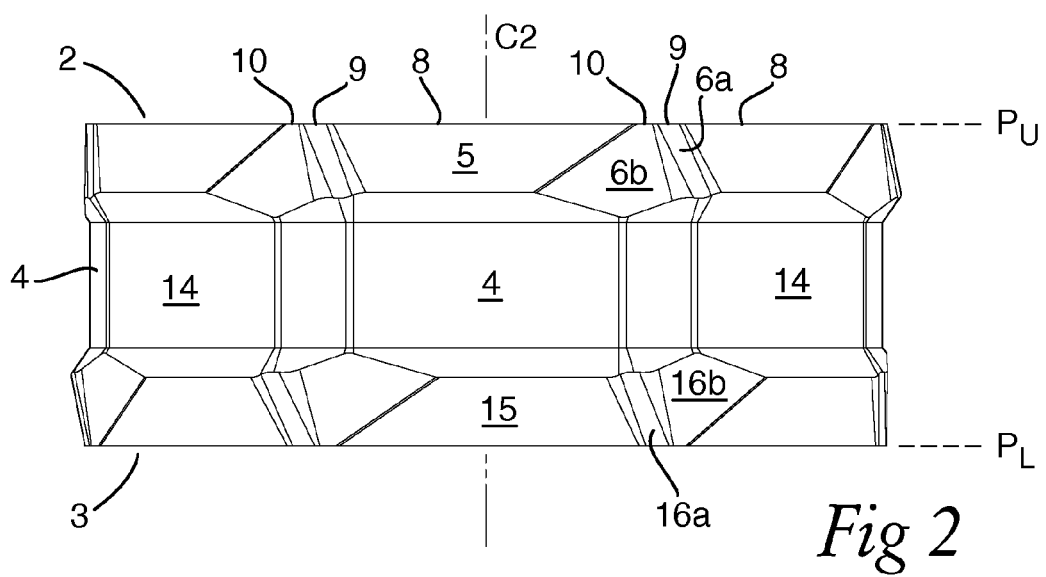
FIG. 2 is a side view of the cutting insert of FIG. 1.
Figure 3:
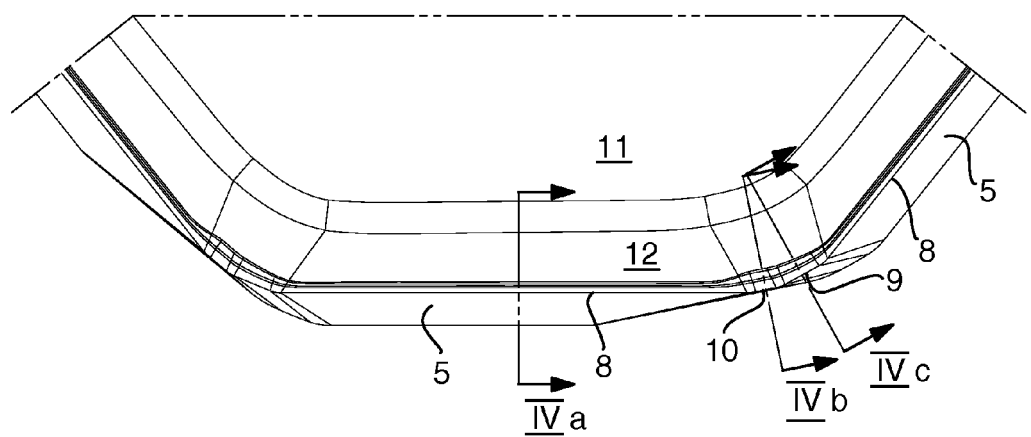
FIG. 3 is a partial top view of the cutting insert of FIG. 1.
Figure 4C:
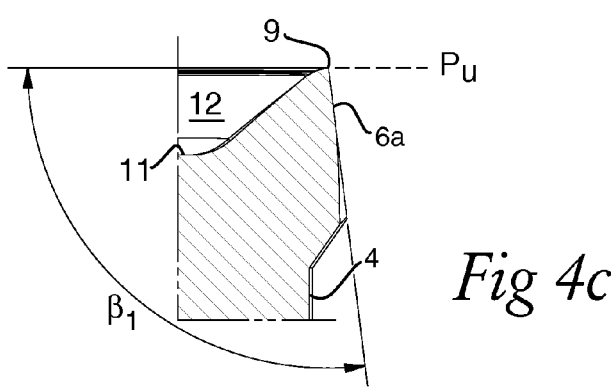

As can be seen in FIG. 2, the main clearance surface 5 is formed at an obtuse inner angle α with respect to the upper extension plane $P_U$ as seen in side elevation view. In FIG. 4a, a partial cross-section taken across the main clearance surface shows the obtuse angle α. In this embodiment, the inner angle α is 107°. The secondary clearance surfaces 6a, 6b are formed at inner angles $\beta_1$, $\beta_2$ with respect to the upper extension plane $P_U$ as seen in side elevation view in FIG. 4b, shown in cross section for the upper second secondary clearance surface 6b, formed at an angle $\beta_2$=97°, and in FIG. 4c shown in cross section for the upper first secondary clearance surface 6a, formed at an angle $\beta_1$=90.5°.

The cutting insert 1 is indexable to different index positions. In one index position, one of the upper cutting edges 7 is cutting, wherein the upper side 2 partially forms a rake surface and the lower side 3 forms a support surface resting on a bottom support surface of an insert seat of a milling tool. In another index position, one of a number of lower cutting edges 17 extending around the lower side 3 is cutting, wherein the lower side 3 partially forms a rake surface, and the upper side 2 forms a support surface resting on the bottom support surface of the insert seat.

FIGS. 15-18 show the cutting insert 1 according to a variety of the first embodiment of the disclosure, mounted in a milling tool 101 according to the disclosure. The milling tool 101 includes a tool body 102 and several cutting inserts 1. The tool body 102 includes a front end 104 and a rear end 105, between which a central rotation axis C1 extends. The tool is rotatable in a direction of rotation R around the central rotation axis C1 and an envelope surface 106 is concentric with the axis C1. Several insert seats 107 are formed in a transition between the front end 104 and the envelope surface 106.

Each insert seat 107 has a bottom support surface against which the lower side 3 of the cutting insert 1 rests, a side support having two side support surfaces against which two of the recessed support surfaces 14 rest, and a chip pocket 110 provided in front of the insert seat 107 in the direction of rotation R of the tool. The cutting inserts 1 are securely and detachably mounted in the insert seats 107 by means of a screw 111.

Figure 17:
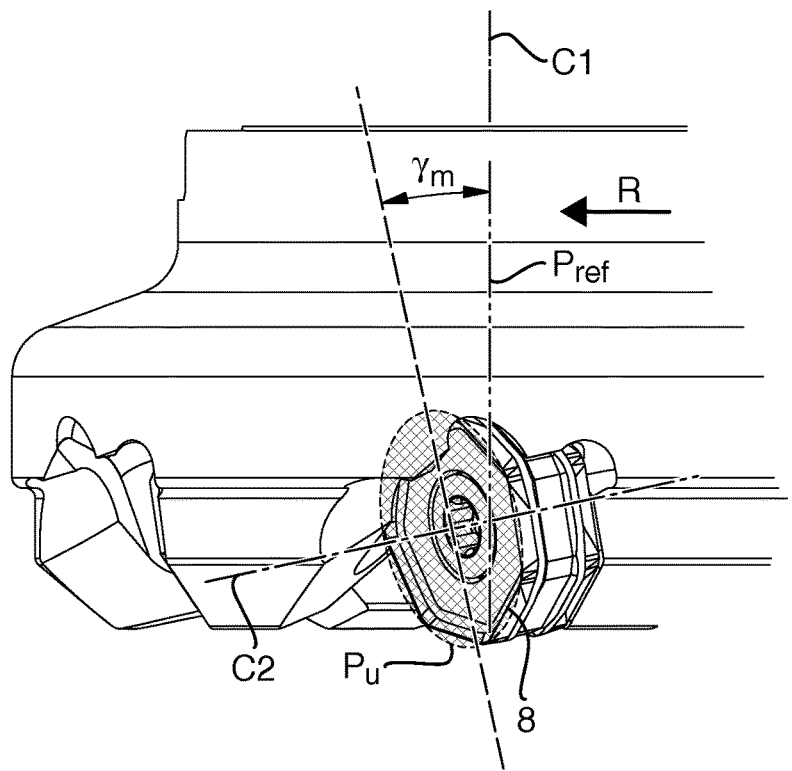
FIG. 17 shows the axial tipping-in angle in a partial side view of the milling tool of FIG. 15.
Figure 18:
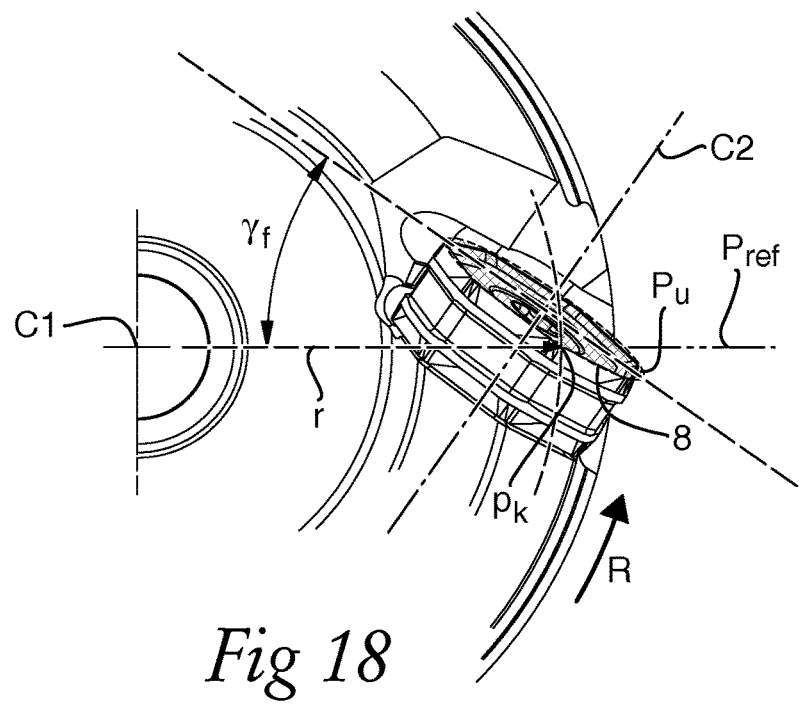
FIG. 18 shows the radial tipping-in angle in a partial planar view of the milling tool of FIG. 15.
Figure 19:
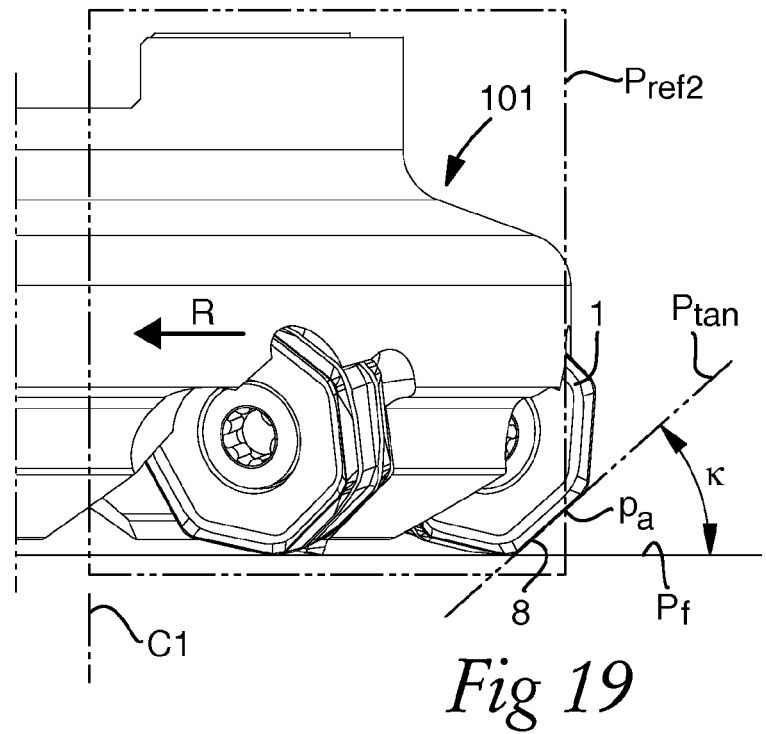
FIG. 19 shows the entering angle in a partial side view of the milling tool of FIG. 15.

The tool shown in FIGS. 15-19 is configured such that the chip-removing main cutting edge portion 8 is at an entering angle κ of about 42°, so that the first secondary cutting edge portion 9 acts as a corner edge, while the second secondary cutting edge portion 10 acts as a surface-wiping secondary edge. The entering angle κ is the angle that the main cutting edge portion 8 makes with the direction of feed of the milling tool as seen in side elevation view, as shown in FIG. 19. The entering angle κ is more specifically defined as the angle between a plane $P_{tan}$ and a plane $P_f$ measured in a reference plane $P_{ref2}$, which planes $P_{tan}$, $P_f$ and $P_{ref2}$ will be defined below. The entering angle varies along the edge, even though the edge is straight.

The cutting insert 1 is tipped in so that the upper extension plane $P_U$ is at a negative radial tipping-in angle $\gamma_f$ of −35°. The radial tipping-in angle $\gamma_f$, shown in FIG. 18, is the angle between the upper extension plane $P_U$ and a line along the radial vector r of the tool as seen in planar view. More specifically, the radial tipping-in angle $\gamma_f$ is obtained by taking a plane $P_f$ normal to the central rotation axis C1 and passing through a point $p_k$, and in the plane $P_f$ measure the angle between a reference plane $P_{ref}$ and the upper extension plane $P_U$ as shown in FIG. 18, which is a view in the plane $P_f$. The reference plane $P_{ref}$ is a plane spanned by the central rotation axis C1 and a radial vector r perpendicular to the central rotation axis C1 and passing through the point $p_k$.

The radius r of the tool is measured between the central rotation axis C1 and the point $p_k$, which for this cutting insert 1 is located in the transition between the main cutting edge portion 8 and the adjacent second secondary cutting edge portion 10, in this embodiment a surface-wiping secondary edge. With a negative radial tipping-in angle $\gamma_f$, the upper extension plane $P_U$ is directed outwards with regard to the central rotation axis C1 of the tool.

Figure 20:
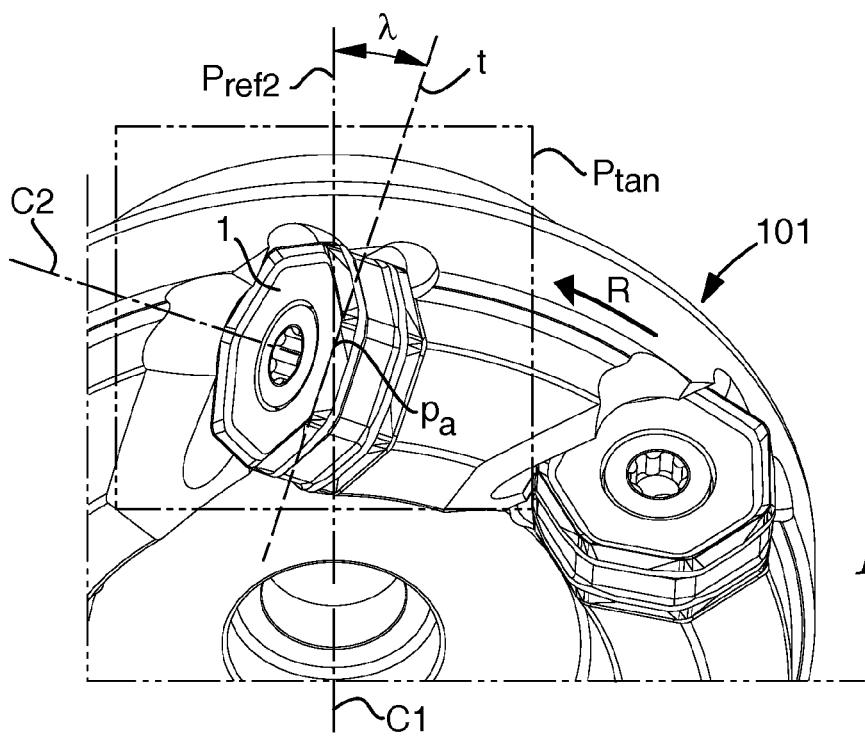
FIG. 20 shows the angle of inclination in a partial perspective view of the milling tool of FIG. 15.

The cutting insert 1 is further tipped in so that the upper extension plane $P_U$ is at a negative axial tipping-in angle $\gamma_m$ of −10°. The axial tipping-in angle $\gamma_m$, shown in FIG. 17, is the angle between the upper extension plane $P_U$ and the central rotation axis C1 of the tool. More specifically, the axial tipping-in angle $\gamma_m$ is obtained by measuring the angle between the upper extension plane $P_U$ and the reference plane $P_{ref}$ in a plane $P_m$ (not shown), which plane $P_m$ is perpendicular to the upper extension plane $P_U$, parallel to the central rotation axis C1 and passes through the point $p_k$. With a negative axial tipping-in angle $\gamma_m$, the upper extension plane $P_U$ is inclined towards the front end 104 of the milling tool. With an entering angle κ of approximately 42°, a radial tipping-in angle $\gamma_f$ of −35° and an axial tipping-in angle $\gamma_m$ of −10°, the main cutting edge portion 8 is at an angle of inclination λ of approximately 20°. The angle of inclination λ, shown in FIG. 20, is the angle that the main cutting edge portion 8 in a point $p_a$, or a tangent t to the main cutting edge portion 8 in that point, makes with a second reference plane $P_{ref2}$. The second reference plane $P_{ref2}$ is parallel with and includes the central rotation axis C1 and includes the point $p_a$ on the main cutting edge portion 8. The angle of inclination λ is measured in a tangential plane $P_{tan}$.

The tangential plane $P_{tan}$ is tangential to the main cutting edge portion 8 in the point $p_a$ and is perpendicular to the second reference plane $P_{ref2}$.

In FIG. 20, the angle of inclination λ is shown by looking at the main cutting edge portion 8 from below the front end 104 of the tool 101, along a line which is normal to the tangential plane $P_{tan}$. For the cutting insert 1 according to the first embodiment, the angle of inclination λ is approximately constant along the main cutting edge portion 8, since the main cutting edge portion 8 is essentially rectilinear. For a curved main cutting edge portion, the angle of inclination will vary along the edge.

With the cutting insert 1 according to the first embodiment mounted in the milling tool 101 as described above, the clearance behind the main cutting edge portion 8 in the direction of rotation R of the tool is optimised with regards to the obtuse inner angle α so that the cutting insert 1 has high strength, while still providing sufficient clearance. The clearance behind the surface-wiping secondary cutting edge 10 is sufficient thanks to the negative axial tipping-in angle $\gamma_m$. With the chosen values for the inner angles α, $\beta_1$ and $\beta_2$, the clearance behind the main cutting edge portion 8 and the secondary cutting edges 9, 10 is in a suitable range. The recessed upper base surface 11 ensures that a positive rake angle is achieved despite the large negative radial tipping-in angle $\gamma_f$. For this purpose, the base surface 11 is in this embodiment formed at a distance of 1.2 mm from the main cutting edge portion 8. The chip surface 12 is at the main portion of the main cutting edge 8 inclined at an angle $\varphi_1$ between 40° and 55°, here approximately 44°, with respect to the upper extension plane $P_U$. The reinforcement land 13 is at an angle $\varphi_2$ between 25° and 45°, as shown in FIG. 4a. The recessed support surfaces 14 formed in the side surface 4 of the cutting insert 1 provide a large support area resting on the side support surfaces of the milling tool 101. This prevents rotation of the cutting insert 1 within the insert seat 107 of the milling tool 101.

The milling tool in which the cutting insert 1 according to the first embodiment is mounted may instead be configured for an entering angle κ of approximately 25°, in which case the first secondary cutting edge portion 9 acts as a surface-wiping secondary edge. The second secondary cutting edge portion 10 is for moderate cutting depths not active as a cutting edge. However, the second secondary cutting edge portion 10 adjacent the active main cutting edge portion 8 may be used as a prolongation of the main cutting edge portion 8 if the cutting depth is large. For an entering angle κ of approximately 25°, the axial tipping-in angle $\gamma_m$ may be set to −17° and the radial tipping-in angle $\gamma_f$ to −45°, in which case the angle of inclination λ is approximately 33°. It is preferable to adjust the radial and the axial tipping-in angles so that the angle of inclination λ is within the range 15°≤λ≤50°.

Further embodiments of the cutting insert 1 will now be described. It is to be noted that the same reference sign designates the same or a similar element in all embodiments disclosed.

Figure 5:
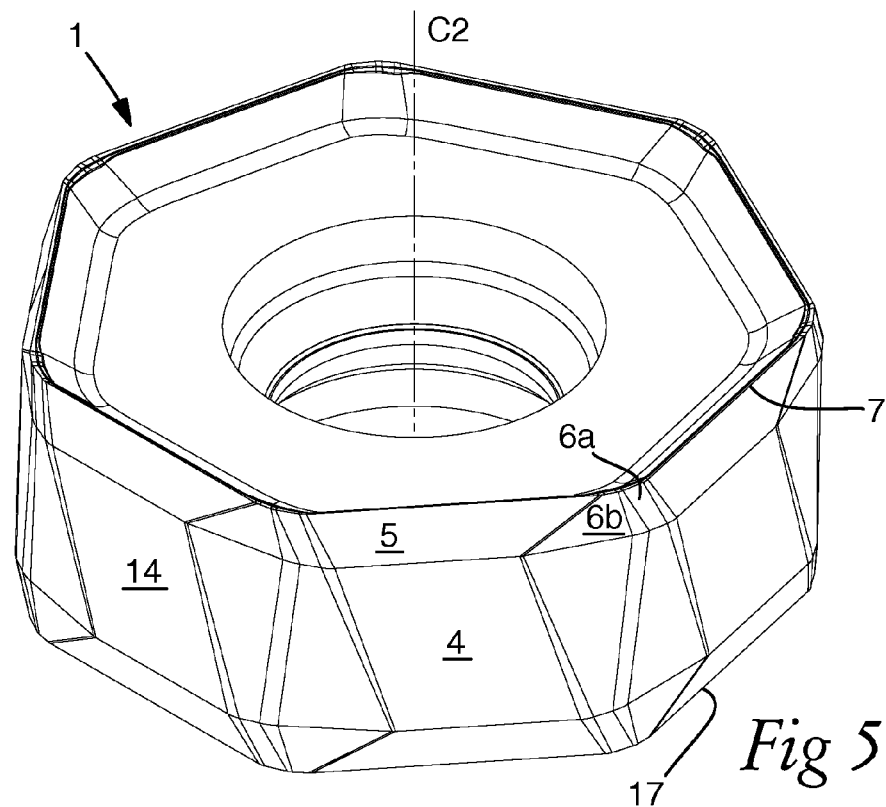
FIG. 5 is a perspective view of a cutting insert according to a second embodiment of the disclosure.
Figure 6:
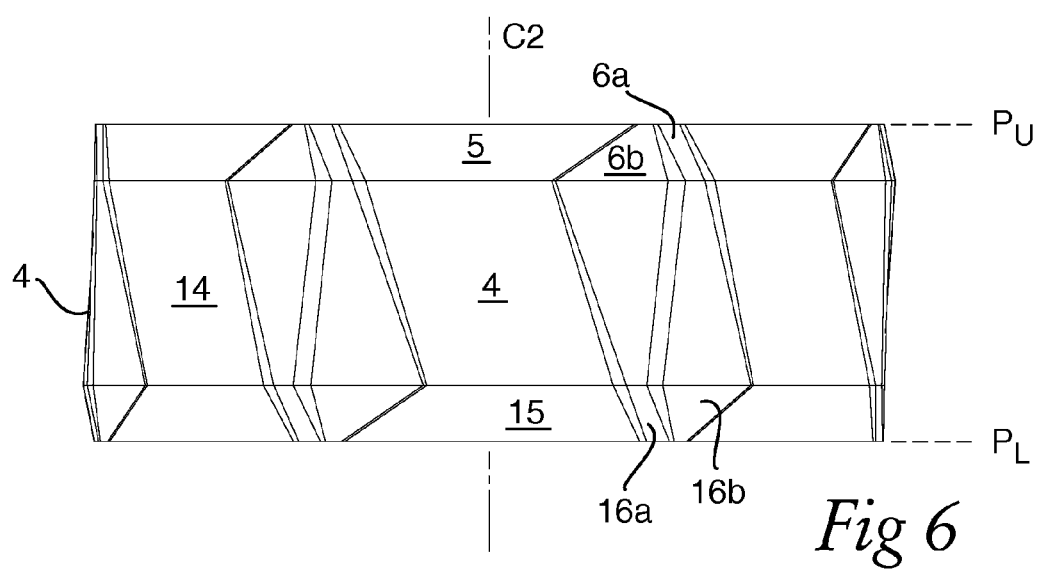
FIG. 6 is a side view of the cutting insert of FIG. 5.

A second embodiment of the cutting insert according to the disclosure is shown in FIGS. 5-6. The cutting insert 1 according to this embodiment only differs from the cutting insert of the first embodiment in that it lacks recessed support surfaces. Instead, the side surface 4 extends without recesses from the upper cutting edges 7 to the lower cutting edges 17, including upper clearance surfaces 5, 6a, 6b and lower clearance surfaces 15, 16a, 16b. The side surface 4 also includes non-recessed support surfaces 14 extending between the main clearance surfaces 5, 15.

Figure 7:
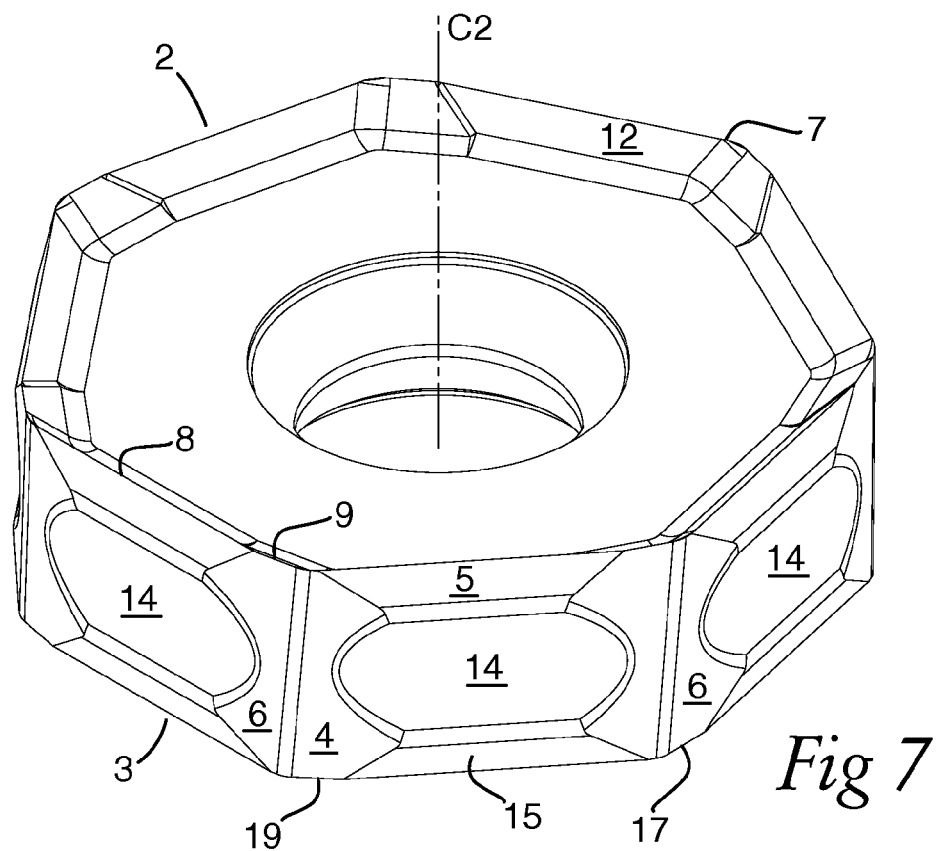
FIG. 7 is a perspective view of a cutting insert according to a third embodiment of the disclosure.

A third embodiment of the cutting insert according to the disclosure is shown in FIGS. 7-9. The cutting insert 1 according to this embodiment is also double-sided and indexable and differs from the cutting insert according to the first embodiment in that it comprises upper cutting edges 7, each including a main cutting edge portion 8 and one secondary cutting edge portion 9 in the form of a surface-wiping secondary edge. Between the secondary cutting edge portion 9 and the subsequent main cutting edge portion 8 is a radial transition. Since the cutting insert 1 is double-sided, the lower side 3 is identical to the upper side 2, with lower cutting edges 17 extending around the lower side 3.

The cutting insert 1 according to this embodiment further differs from the first embodiment in that it lacks a reinforcement land. Instead, the upper side 2 is formed with a chip surface 12 extending between the upper cutting edges 7 and a recessed upper base surface 11. The cutting insert 1 also differs in the design of the side surface 4. Here, the side surface 4 includes upper and lower main clearance surfaces 5, 15 and a secondary clearance surface 6 that extends all the way between the upper secondary cutting edge portion 9 and a corresponding lower secondary cutting edge portion 19. The recessed support surfaces 14 are rounded and are only formed below the upper main cutting edge portions 8.

As can be seen in FIGS. 9a-c, the upper main clearance surface is formed at an obtuse inner angle $\alpha$ of 107° with respect to the upper extension plane $P_U$ while the secondary clearance surface 6 is formed at a nearly right inner angle $\beta$ with respect to the upper extension plane $P_U$. With these angles, the cutting insert is optimised such that at slightly negative axial tipping-in angles and strongly negative radial tipping-in angles, the clearances behind the main cutting edge portion 8 and the secondary cutting edge portion 9 are within a suitable range.

Figure 10:
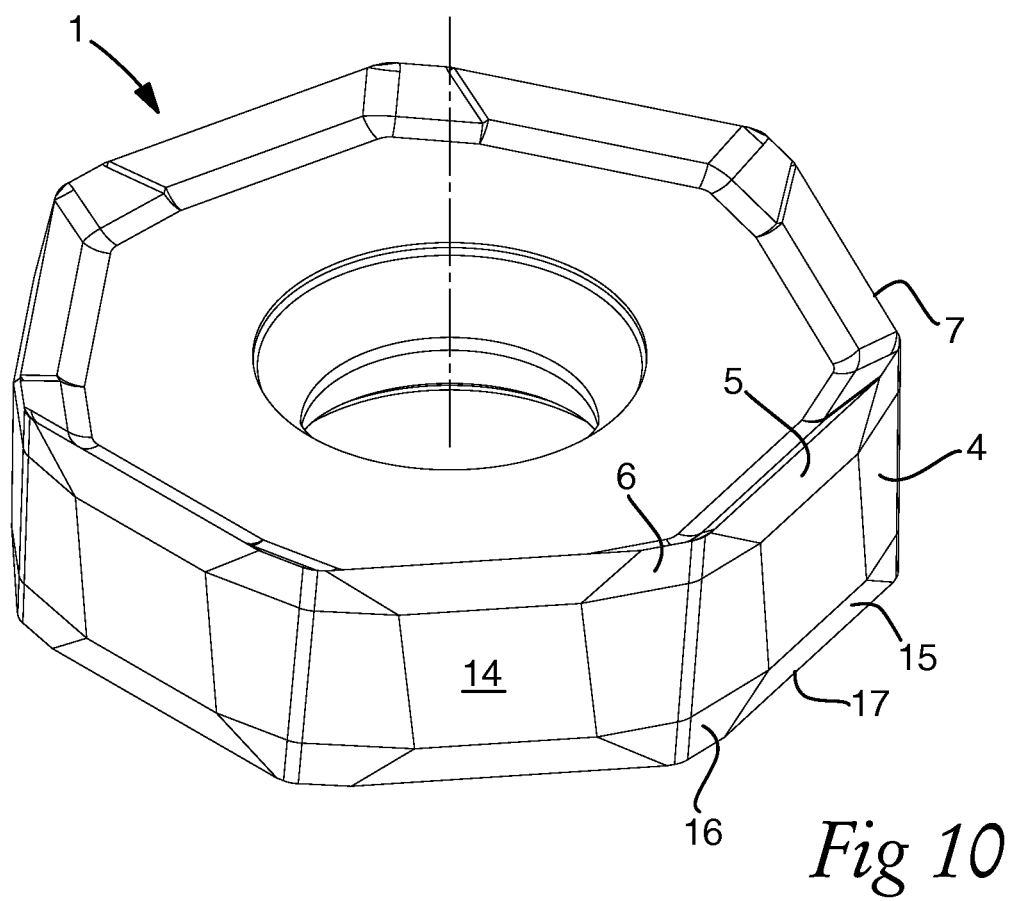
FIG. 10 is a perspective view of a cutting insert according to a fourth embodiment of the disclosure.

A fourth embodiment of the cutting insert according to the disclosure is shown in FIG. 10. The cutting insert 1 according to this embodiment only differs from the cutting insert according to the third embodiment in that it lacks recessed support surfaces. Instead, the side surface 4 extends without recesses from the upper cutting edges 7 to the lower cutting edges 17, including upper main clearance surfaces 5, lower main clearance surfaces 15, non-recessed support surfaces 14 extending between the main clearance surfaces 5, 15, and upper and lower secondary clearance surfaces 6, 16.

Figure 11:
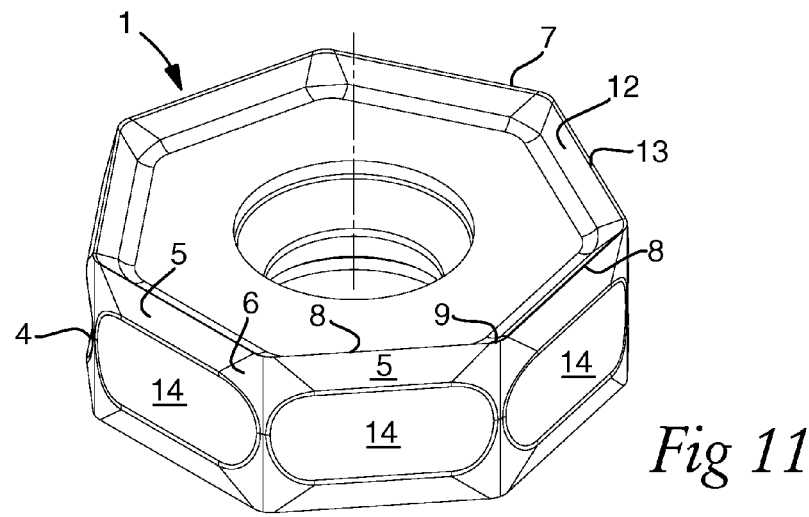
FIG. 11 is a perspective view of a cutting insert according to a fifth embodiment of the disclosure.
Figure 12:
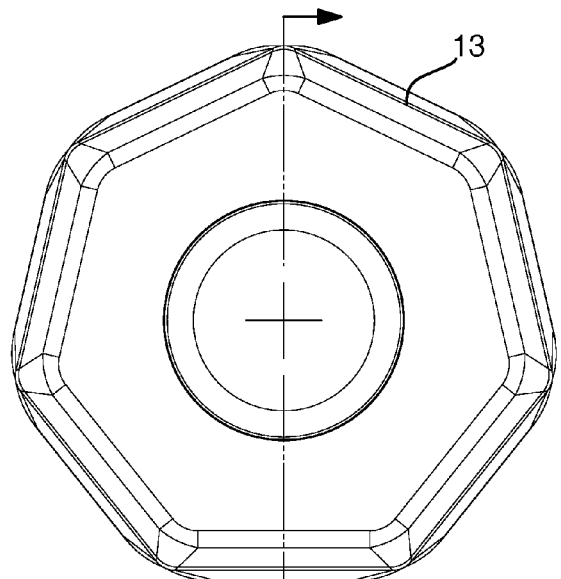
FIG. 12 is a top view of the cutting insert of FIG. 11.
Figure 13:
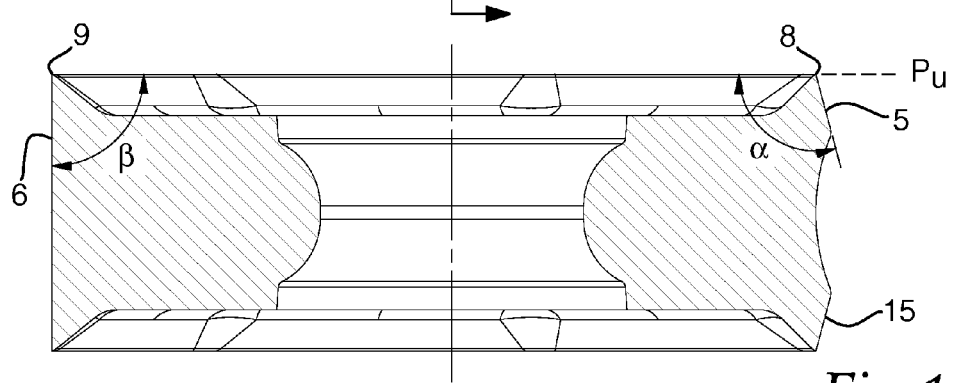
FIG. 13 is a cross-section taken along the line in FIG. 12.

A fifth embodiment of the cutting insert according to the disclosure is shown in FIGS. 11-13. The cutting insert 1 according to this embodiment differs from the third embodiment in that instead of a surface-wiping secondary cutting edge, the secondary cutting edge portion 9 is formed as a curved cutting edge 9 with a corner radius defining the radius of curvature. The curved cutting edge portion 9 extends between two adjacent main cutting edge portions 8. The cutting insert further differs from the third embodiment in that it comprises a reinforcement land 13 extending between the upper cutting edges 7 and the upper chip surface 12.

As in the third embodiment, the side surface 4 is formed with rounded recessed support surfaces 14 below the upper main clearance surfaces 5. The secondary clearance surface 6 is formed as a curved surface, with a gradual transition between the main clearance surface 5 and the secondary clearance surface 6. Since the cutting insert 1 according to the fifth embodiment is formed with curved cutting edges 9 with a corner radius, the cutting insert according to this embodiment has mirror symmetry with respect to the line shown in FIG. 12, i.e. a bisector cutting the curved cutting edge 9 in two equal parts. As can be seen in FIG. 13, the secondary clearance surface 6, below the bisector, is formed at a right angle $\beta$ with respect to the upper extension plane $P_U$, while the main clearance surface 5 is formed at an obtuse inner angle $\alpha$ of around 107°.

With a cutting insert 1 according to this embodiment mounted in a milling tool with a negative radial tipping-in angle $\gamma_f$ of −35° and a negative axial tipping-in angle $\gamma_m$ of −10°, the functional clearance behind both the main cutting edge portion 8 and behind the secondary cutting edge portion 9 is approximately 10°.

Figure 14:
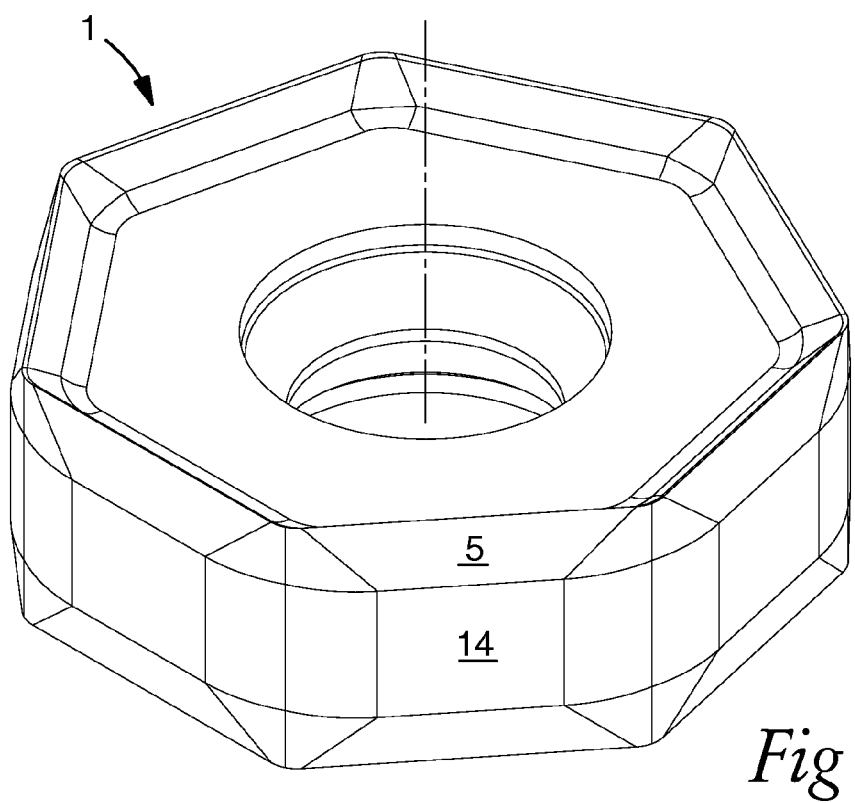
FIG. 14 is a perspective view of a cutting insert according to a sixth embodiment of the disclosure.
Figure 15:
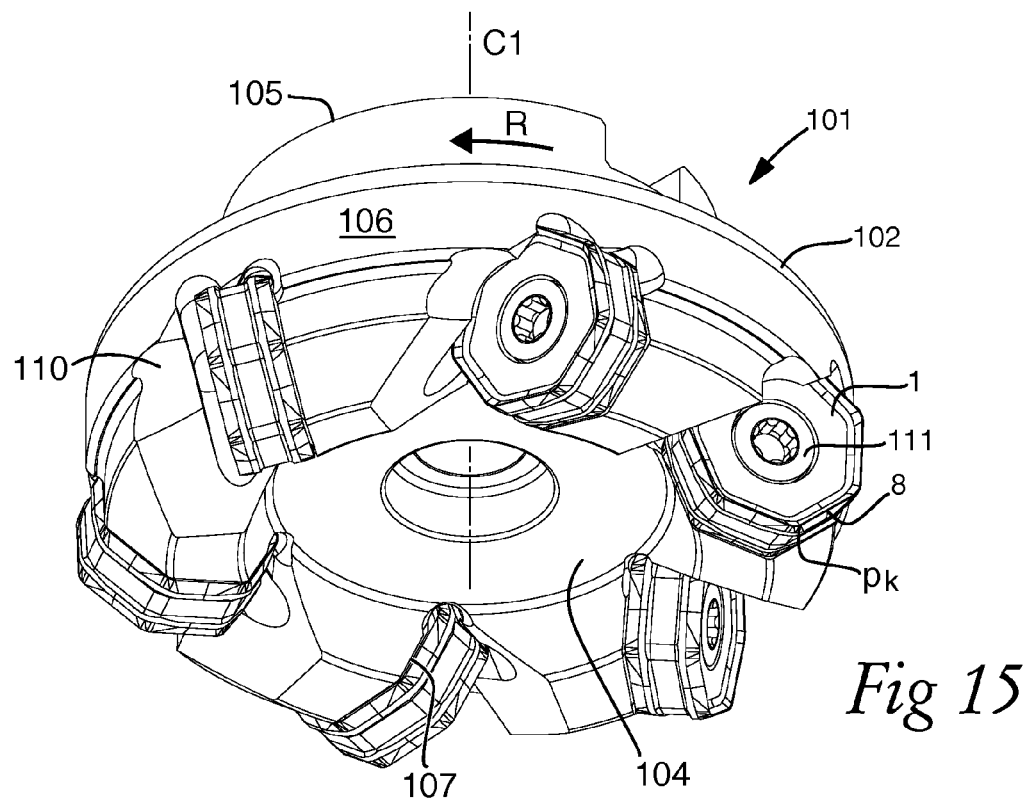
FIG. 15 is a perspective view of a milling tool according to the invention.
Figure 16:
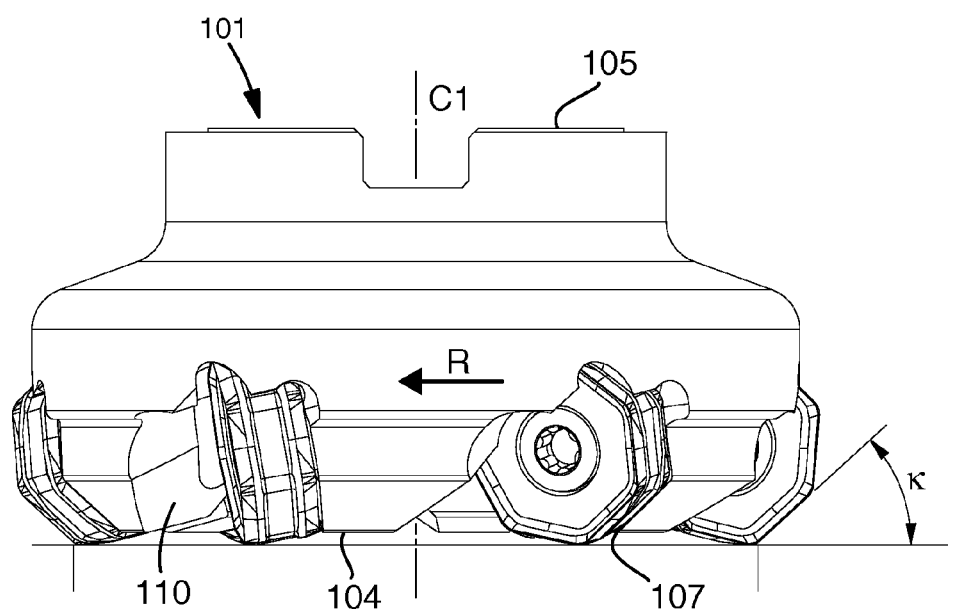
FIG. 16 is a side view of the milling tool of FIG. 15.

A sixth embodiment of the cutting insert according to the disclosure is shown in FIG. 14. The cutting insert 1 according to this embodiment differs from the fifth embodiment only in that it lacks recessed support surfaces, but instead has non-recessed support surfaces 14 below the upper main clearance surfaces 5.

Figure 21A:
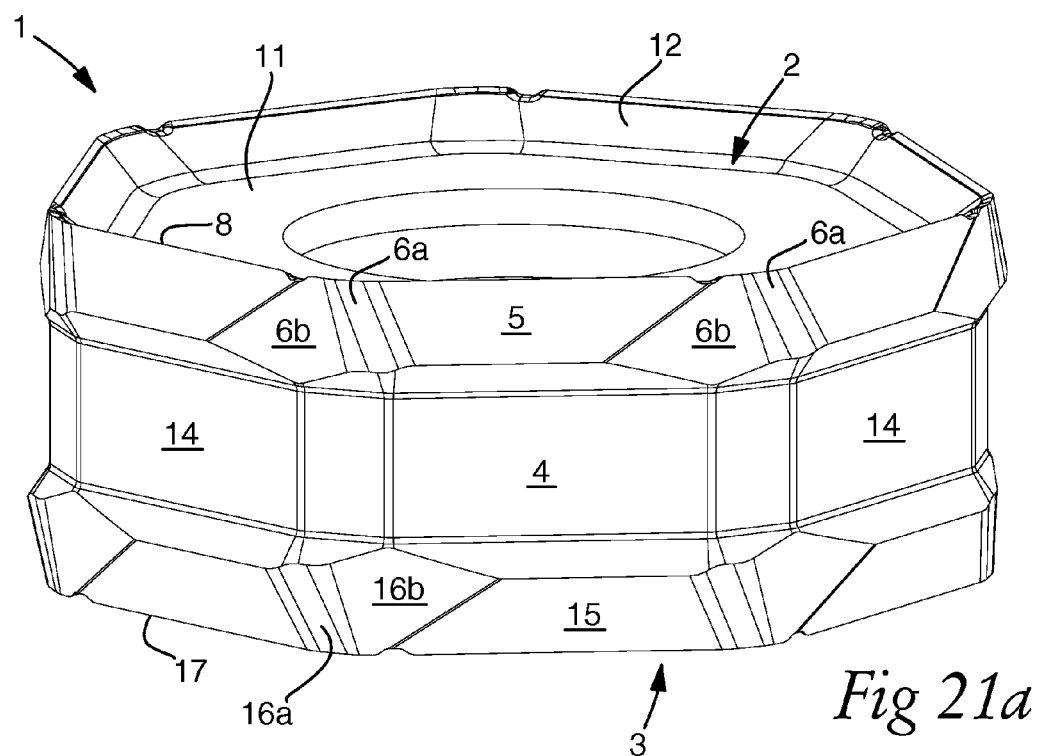
FIGS. 21a-b are a perspective view and a side view of a seventh embodiment of the cutting insert.
Figure 21B:
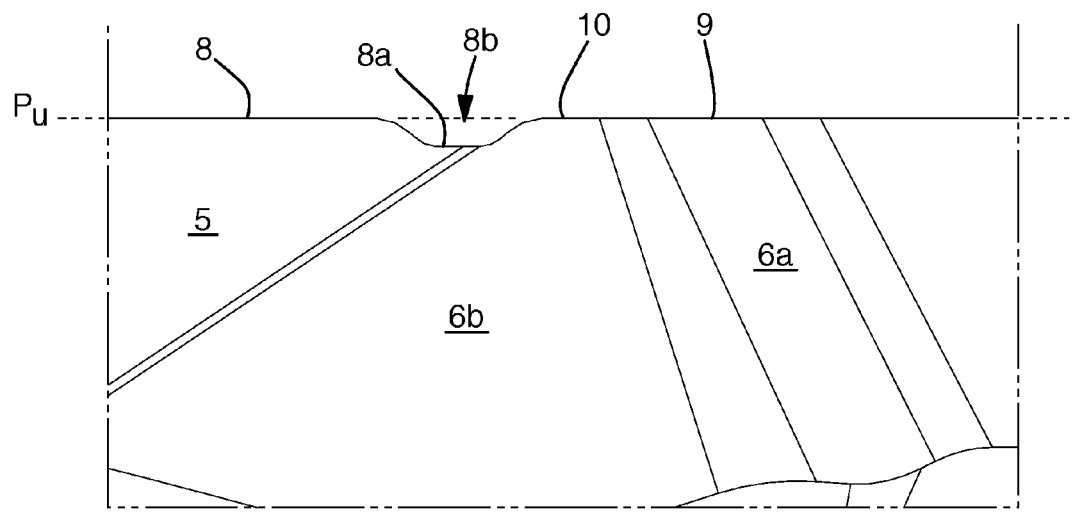

A seventh embodiment of the cutting insert is shown in FIGS. 21a and 21b. The cutting insert according to this embodiment only differs from the cutting insert of the first embodiment in that an end portion 8a of the main cutting edge portion 8 forms a recess 8b as seen in a side elevation view of the insert so that the end portion 8a of the main cutting edge portion 8 is located below a successive secondary cutting edge portion 9, 10 with respect to the upper extension plane $P_U$. A reliable clearance between the workpiece and an inactive main cutting edge portion 8 adjacent an active secondary cutting edge portion 9, 10 is hereby achieved. Hence, the recess 8b in the end portion 8a of the inactive main cutting edge 8 situated radially inside an active secondary cutting edge portion 9, 10 during milling (see FIG. 19) provides the clearance to the machined surface Pf. This embodiment is also double-sided with the lower side 3 identical to the upper side 2 so that the cutting insert is indexable in seven different index positions on the upper side 2 and seven different index positions on the lower side 3.

Figure 22A:
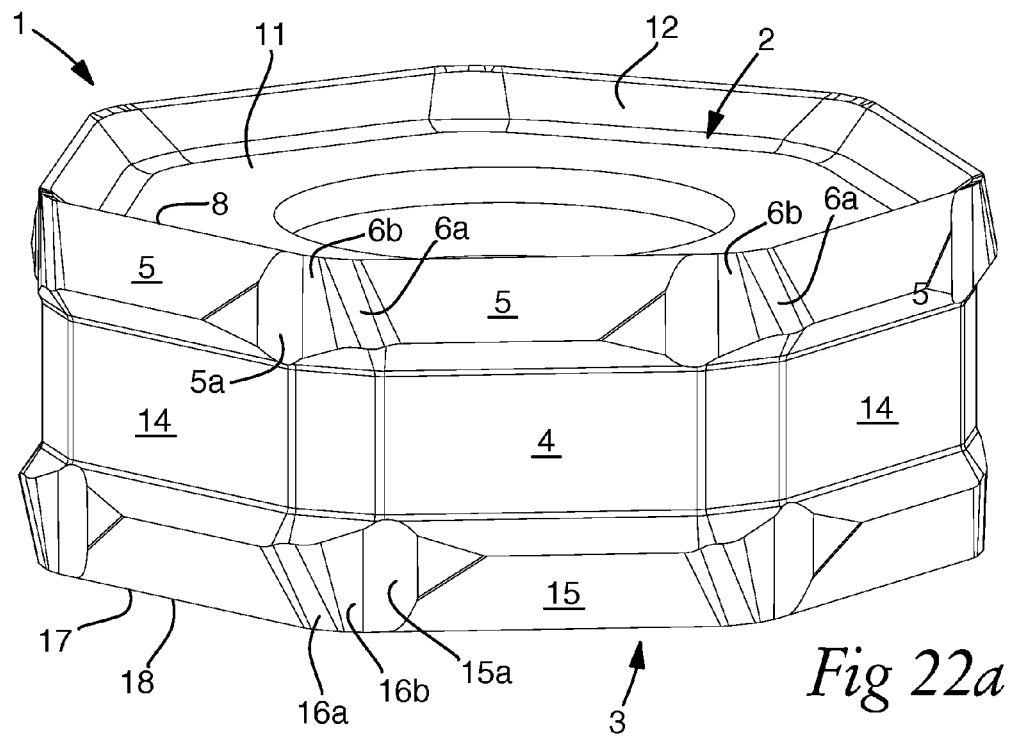
FIG. 22a-b are a perspective view and a side view of an eighth embodiment of the cutting insert.
Figure 22B:
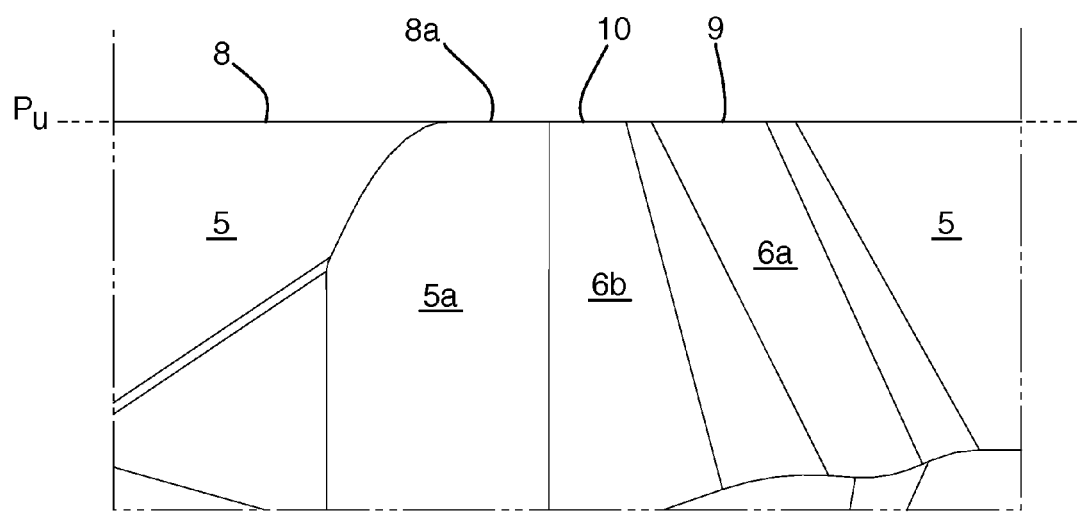

An eighth embodiment of the cutting insert is shown in FIGS. 22a and 22b. The cutting insert according to this embodiment only differs from the cutting insert of the first embodiment in that an end portion 5a of the main clearance surface 5 at an end portion 8a of the main cutting edge portion has a smaller inner angle than the obtuse inner angle $\alpha$ of the remaining main clearance surface. The end portion 5a of the main clearance surface 5 may be provided with an inner angle at around 90°, or in the same range as the inner angle provided on the secondary clearance surface. This embodiment provides another way of achieving a reliable clearance between the workpiece and an inactive main cutting edge portion 8 adjacent an active secondary cutting edge portion 9, 10. The end portion 5a of the main clearance surface 5 at the end portion 8a of the inactive main cutting edge 8 is situated radially inside an active secondary cutting edge portion 9, 10 during milling (see FIG. 19) and clears the machined surface Pf. This embodiment is also double-sided with the lower side 3 identical to the upper side 2 so that the cutting insert is indexable in seven different index positions on the upper side 2 and seven different index positions on the lower side 3.

Figure 23A:
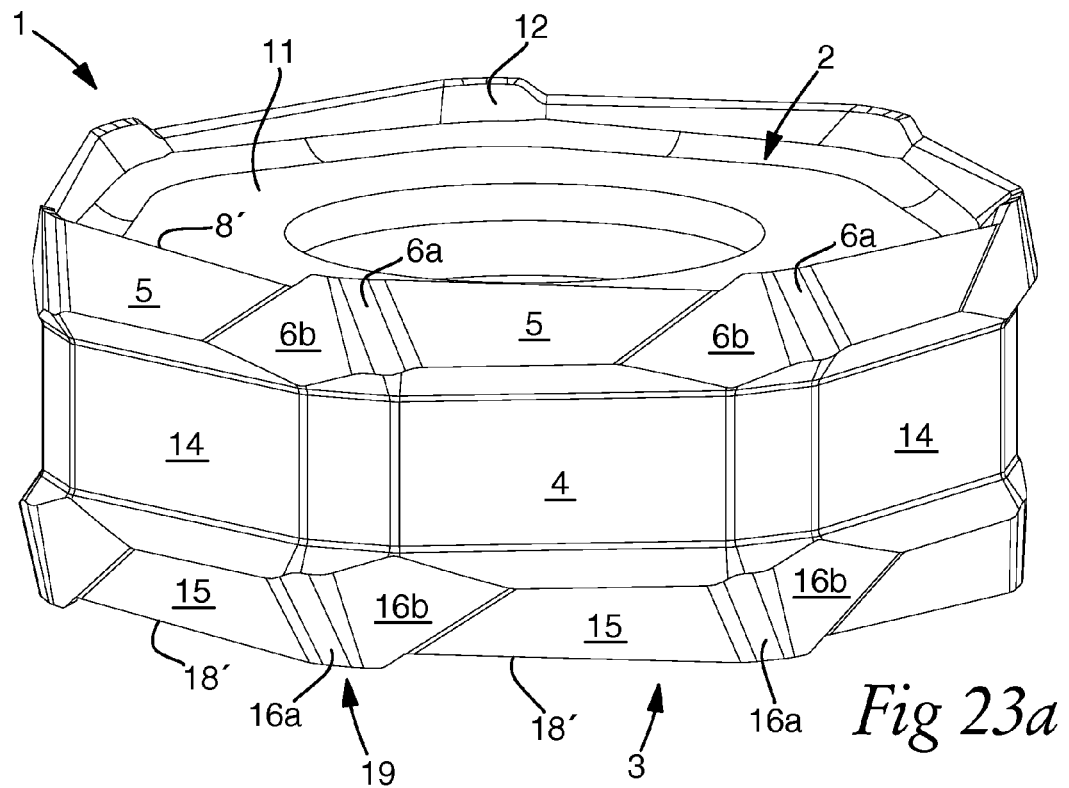
FIG. 23a-b are a perspective view and a side view of a ninth embodiment of the cutting insert.
Figure 23B:
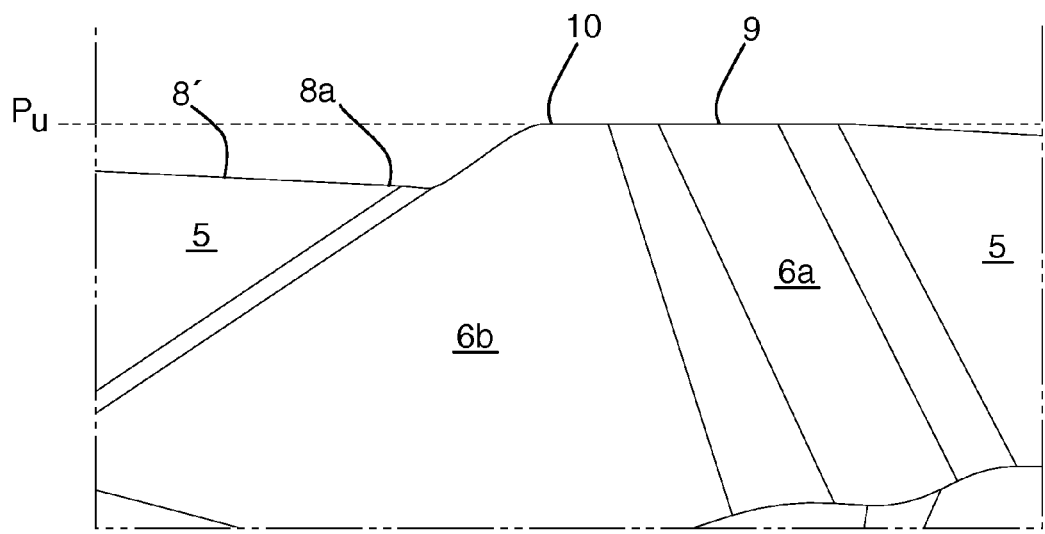

A ninth embodiment of the cutting insert is shown in FIGS. 23a and 23b. The cutting insert according to this embodiment only differs from the cutting insert of the first embodiment in that the main cutting edge portion 8' is inclined as seen in side elevation view of the cutting insert so that the main cutting edge portion 8' is declining with respect to the upper extension plane $P_U$ in a direction toward an end of the main cutting edge portion 8', wherein an end portion 8a of the main cutting edge portion 8' is located below a successive secondary cutting edge portion 9, 10 with respect to the upper extension plane $P_U$. This embodiment also achieves a reliable clearance between the workpiece $P_f$ (see FIG. 19) and an inactive main cutting edge portion situated radially inside an adjacent and active secondary cutting edge portion 9, 10 during milling. There may be a risk that at least the end portion 8a of the inactive main cutting edge portion, and in particular its main clearance surface 5, adjacent the active secondary cutting edge portion 9, 10, will collide with the workpiece (surface $P_f$) during milling. Clearance is hereby achieved by inclining the (inactive) main cutting edge 8' portion so that at least its end portion 8a is situated below the successive (active) secondary cutting edge portion 9, 10 with respect to the upper extension plane $P_U$. FIGS. 23a and 23b show a main cutting edge portion being formed as a straight edge 8' having a constant inclination along the entire length of the cutting edge 8'. It may however be partly inclined or curved in a side elevation view of the cutting insert as long as the end portion 8a is located below the secondary cutting edge portion 9, 10.

Figure 24A:
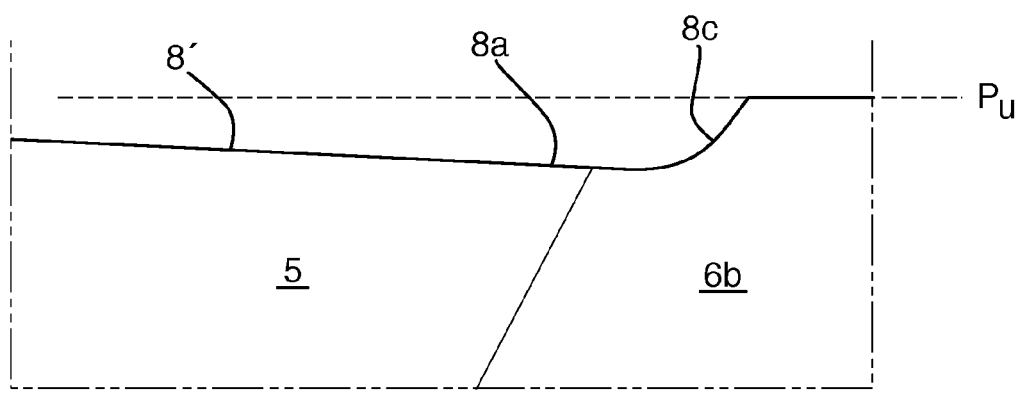
FIG. 24a-b are a tenth and eleventh embodiment respectively of a transition edge in the ninth embodiment.
Figure 24B:
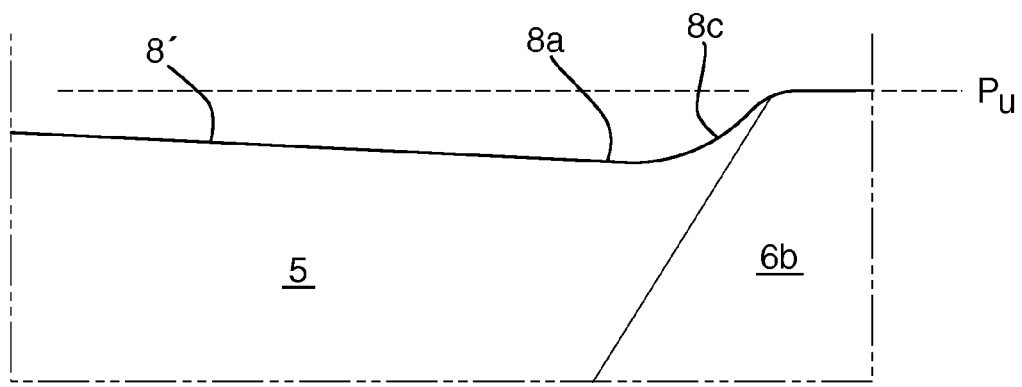

FIGS. 24a and 24b show a tenth and eleventh embodiment respectively of a transition between the inclined main cutting edge portion 8' and the secondary cutting edge portion 10 of the ninth embodiment. The end portion 8a of the main cutting edge portion 8' is hereby connected to or includes an ascending transition edge 8c connected to the successive secondary cutting edge portion 10. The ascending transition edge 8c is relatively short and is used to connect the end cutting edge portion 8a to the successive secondary cutting edge portion in a smooth manner and thereby avoid abrupt/sharp corners. This ca increase the strength of the cutting edge line in the transition between cutting edge portions. In the tenth embodiment shown in FIG. 24a, the end portion 8a of the inclined main cutting edge portion 8' partly extends into and thereby recesses (removes) a minor part of the secondary cutting edge portion 10, wherein an ascending transition edge 8c is formed and connected to the secondary cutting edge portion 10. In the eleventh embodiment shown in FIG. 24b, the end portion 8a of the inclined main cutting edge portion 8' includes an ascending transition edge 8c connected to the successive secondary cutting edge portion 10.

The disclosure is not limited to the embodiments disclosed but may be varied and modified within the scope of the following claims. For instance, the cutting edges may include curved main cutting edge portions, the cutting insert may be single-sided with cutting edges extending only around the upper side, a cutting insert with curved secondary cutting edge portion with a corner radius may be formed with planar recessed side support surfaces instead of rounded, the insert geometry could be with or without reinforcement land or lands, the reinforcement land and/or the chip surface may be curved surfaces, or the cutting insert may be formed with a larger number of cutting edges, such as eight cutting edges or more. The cutting insert may be designed for left hand rotation of the tool as well as for right hand rotation of the tool. The cutting insert may also, instead of being screw mounted, be secured by for example clamps.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. An indexable cutting insert for a milling tool, the cutting insert comprising:
an upper side defining an upper extension plane;
a lower side defining a lower extension plane parallel to the upper extension plane, wherein a center axis extends perpendicularly through the upper extension plane and the lower extension plane;
a side surface connecting the upper side and the lower side, the side surface including a plurality of upper main clearance surfaces and secondary clearance surfaces; and
at least six identical and alternately usable upper cutting edges extending around the upper side, wherein each cutting edge includes a chip removing main cutting edge portion and at least one secondary cutting edge portion, wherein the main cutting edge portion is formed in a transition between the upper side and one of said upper main clearance surfaces, and the secondary cutting edge portion is formed in a transition between the upper side and one of said secondary clearance surfaces in a region between two main cutting edge portions, wherein each of said upper main clearance surfaces is formed at an obtuse inner angle $\alpha$ with respect to the upper extension plane as seen in side elevation view, wherein the inner angle between the upper extension plane and each of said upper main clearance surfaces is within the range $100° \leq \alpha \leq 118°$.

2. An indexable cutting insert for a milling tool, the cutting insert comprising:
an upper side defining an upper extension plane, wherein the upper side includes a recessed upper base surface extending in parallel with the upper extension plane, and an upper chip surface extending between the upper cutting edges and the upper base surface;
a lower side defining a lower extension plane parallel to the upper extension plane, wherein a center axis extends perpendicularly through the upper extension plane and the lower extension plane;
a side surface connecting the upper side and the lower side, the side surface including a plurality of upper main clearance surfaces and secondary clearance surfaces; and
at least six identical and alternately usable upper cutting edges extending around the upper side, wherein each cutting edge includes a chip removing main cutting edge portion and at least one secondary cutting edge portion, wherein the main cutting edge portion is formed in a transition between the upper side and one of said upper main clearance surfaces, and the secondary cutting edge portion is formed in a transition between the upper side and one of said secondary clearance surfaces in a region between two main cutting edge portions, wherein each of said upper main clearance surfaces is formed at an obtuse inner angle $\alpha$ with respect to the upper extension plane as seen in side elevation view, wherein the inner angle between the upper extension plane and each of said upper main clearance surfaces is within the range $100° \leq \alpha \leq 118°$.

3. The cutting insert according to claim 2, wherein the upper side includes at least one upper reinforcement land connecting the upper cutting edges with the upper chip surface.

4. The cutting insert according to claim 1, wherein each of said secondary clearance surfaces is formed at an inner angle $\beta$ with respect to the upper extension plane as seen in side elevation view, wherein $\beta < \alpha$.

5. The cutting insert according to claim 4, wherein the inner angle $\beta$ between the upper extension plane and the secondary clearance surface below at least a part of the upper secondary cutting edge is within the range $85° \leq \beta \leq 100°$.

6. The cutting insert according to claim 1, comprising at least seven identical and alternately usable upper cutting edges.

7. The cutting insert according to claim 1, wherein the cutting insert is double-sided with the lower side being identical to the upper side.

8. The cutting insert according to claim 1, wherein the side surface includes a plurality of recessed support surfaces.

9. The cutting insert according to claim 1, wherein the main cutting edge portion is rectilinear or essentially rectilinear.

10. The cutting insert according to claim 1, wherein the secondary cutting edge portion is in the form of a curved edge portion extending between two adjacent main cutting edge portions and having at least one radius of curvature.

11. The cutting insert according to claim 1, wherein the at least one secondary cutting edge portion is in the form of a surface-wiping secondary edge.

12. The cutting insert according to claim 11, wherein each upper cutting edge has a first and a second surface-wiping secondary edge formed at an angle with respect to each other as seen in plan view.

13. A face milling tool configured for chip-removing machining comprising:
   a tool body including a front end and a rear end, between which a central rotation axis extends around which the tool is rotatable in a direction of rotation;
   at least one insert seat formed in a transition between the front end and an envelope surface extending between the front end and the rear end of the tool body, the at least one insert seat including a bottom support surface, wherein a chip pocket is provided in front of the at least one insert seat in the direction of rotation of the tool; and
   at least one cutting insert securely and detachably mounted in the at least one insert seat, the at least one insert including an upper side defining an upper extension plane, a lower side defining a lower extension plane parallel to the upper extension plane, wherein a center axis extends perpendicularly through the upper extension plane and the lower extension plane, a side surface connecting the upper side and the lower side, the side surface including a plurality of upper main clearance surfaces and secondary clearance surfaces, and at least six identical and alternately usable upper cutting edges extending around the upper side, wherein each cutting edge includes a chip removing main cutting edge portion and at least one secondary cutting edge portion, the main cutting edge portion being formed in a transition between the upper side and one of said upper main clearance surfaces, and the secondary cutting edge portion being formed in a transition between the upper side and one of said secondary clearance surfaces in a region between two main cutting edge portions, wherein each of said upper main clearance surfaces is formed at an obtuse inner angle $\alpha$ with respect to the upper extension plane as seen in side elevation view, wherein the inner angle between the upper extension plane and each of said upper main clearance surfaces is within the range $100° \leq \alpha \leq 118°$.

14. The face milling tool according to claim 13, wherein the tool is configured so that a main cutting edge portion is at an entering angle $\kappa$ smaller than 80°, and so that the upper extension plane of the cutting insert is on one hand radially tipped in at a radial tipping-in angle $\gamma f$ within the range $-60° \leq \gamma f \leq -25°$ and on the other hand axially tipped in at an axial tipping-in angle $\gamma m$ within the range $-20° \leq \gamma m \leq 0°$.

15. The cutting insert according to claim 1, wherein the inner angle $\alpha$ between the upper extension plane and each of said upper main clearance surfaces is within the range $100° \leq \alpha \leq 114°$.

16. The cutting insert according to claim 1, wherein the upper side includes a recessed upper base surface extending in parallel with the upper extension plane and an upper chip surface extending between the upper cutting edges and the upper base surface, wherein a chip surface angle ($\varphi 1$) is within the range $35° \leq \varphi 1 \leq 55°$ with respect to the upper extension plane and along the main cutting edge portion.

17. The cutting insert according to claim 16, wherein chip surface angle ($\varphi 1$) is within the range of $40° \leq \varphi 1 \leq 55°$.

18. The cutting insert according to claim 1, wherein an end portion of the main cutting edge portion forms a recess so that the end portion of the main cutting edge portion is located below a successive secondary cutting edge portion with respect to the upper extension plane.

19. The cutting insert according to claim 1, wherein an end portion of the main clearance surface at an end portion of the main cutting edge portion has a smaller inner angle than the obtuse inner angle ($\alpha$) of the remaining main clearance surface.

20. The cutting insert according to claim 1, wherein the main cutting edge portion is inclined as seen in side elevation view of the cutting insert so that the main cutting edge portion is declining with respect to the upper extension plane in a direction toward an end of the main cutting edge portion, wherein an end portion of the main cutting edge portion is located below a successive secondary cutting edge portion with respect to the upper extension plane.

21. The cutting insert according to claim 19, wherein the end portion of the main cutting edge portion includes an ascending transition edge connected to the successive secondary cutting edge portion.

* * * * *